2,853,515

PRODUCTION OF ALKYL PHOSPHONYL FLUORIDES

Harold Coates, Wombourne, and Philip Rufus Carter, Harborne, Birmingham, England, assignors to the Minister of Supply in Her Majesty's Government of the United Kingdom of Great Britain and Northern Ireland, London, England No Drawing. Application August 8, 1952
Serial No. 303,432

Claims priority, application Great Britain August 9, 1951

2 Claims. (Cl. 260—543)

This invention relates to the manufacture of organic phosphorus compounds particularly fluorides and derivatives thereof, and the aim of the invention is to improve the production of compounds containing at least one carbon-phosphorus bond in the molecular composition, such compounds being intended as intermediates for the manufacture of many other valuable organic phosphorus compounds. The carbon-phosphorus bond in organic phosphorus compounds is very stable against hydrolysis and oxidation and compounds containing this structural element may find valuable application in practice inter alia as plasticisers or in the production of plastics.

The present invention is especially concerned with the chemical treatment of complex organic phosphorus compounds consisting of an alkyl halide, phosphorus trichloride and anhydrous aluminium chloride, for example, the complex formed by the combination of methyl chloride, phosphorus trichloride and aluminium chloride, and one object of the invention is to produce the required product, an alkyl phosphorus halide, in an economical manner and to obtain useful by-products which may be recovered for further use.

According to the invention a complex compound composed of an alkyl halide, a phosphorus trihalide and an aluminium halide, is reacted under controlled conditions with a fluorinating agent, for example hydrogen fluoride, to produce an alkyl phosphorus tetrahalide.

Thus for example a complex compound of an alkyl chloride, phosphorus trichloride, and aluminium chloride may be reacted with a gaseous fluorinating agent, for instance hydrogen fluoride to produce an alkyl phosphorus tetrafluoride.

Furthermore, in accordance with the invention an alkyl phosphorus tetrafluoride may be reacted with a reactive compound containing oxygen to produce alkyl phosphonyl compounds, for example an alkyl phosphonyl fluoride or an alkyl phosphonic acid. These compounds are valuable intermediates containing a carbon-phosphorus bond and may be used for the production of alkyl phosphonyl derivatives.

The invention will now be described with reference to particular compounds.

Thus, for example, if it be desired to produce an organic phosphorus compound containing a methyl group linked to a phosphorus atom the starting material may be a complex compound consisting of methyl chloride, phosphorus trichloride and anhydrous aluminium chloride, which complex compound is already known and can be readily produced in a known manner by a combination of the three components in stoichiometric proportions in an additive reaction. (Journal of Organic Chemistry, 1951, pp. 892–894; Journal of the Chemical Society 1952, pp. 3437–3445.) The complex compound which is a crystalline solid may be reacted in accordance with the invention with a fluorinating agent for instance gaseous hydrogen fluoride to produce methyl phosphorus tetrafluoride, hydrochloric acid and aluminium fluoride. The gaseous products of the process are removed and the methyl phosphorus tetrafluoride isolated therefrom. The process can be represented by the following expression:

$$CH_3Cl \cdot PCl_3 \cdot AlCl_3 + 7HF \rightarrow CH_3PF_4 + AlF_3 + 7HCl$$

An advantage of the process is that the by-products aluminium fluoride and hydrochloric acid are substances of commercial importance. Moreover, if desired, the aluminum fluoride may be reacted with sulphuric acid to produce gaseous hydrofluoric acid which can be used in the main process already described and the aluminium sulphate obtained is also a valuable substance.

The process of the invention is also applicable to other complex compounds comprising an alkyl halide, phosphorus trichloride and aluminium chloride. Thus if the complex compound containing an ethyl group instead of a methyl group is used, then ethyl phosphorus tetrafluoride can be produced. The process thus enables a wide range of alkyl phosphorus fluorides to be obtained. These compounds can then be used to produce organic phosphorus derivatives which themselves may be used as intermediates for the manufacture of other derivatives.

According to another feature of the invention the alkyl phosphorus fluorides produced as aforesaid may be readily converted to organic phosphorus compounds containing oxygen. For example, when the gaseous products of the fluorination are reacted with a reactive compound containing oxygen for example with water, methyl phosphorus tetrafluoride is converted to methylphosphonic acid $CH_3PO(OH)_2$.

The oxygenation process can also be effected in accordance with the invention by the aid of sulphur dioxide. Thus, for example, methyl phosphorus tetrafluoride may be reacted with sulphur dioxide to produce methyl phosphonyl difluoride which is a liquid and thionyl fluoride, a gas. This reaction is indicated as follows, $$CH_3PF_4 + SO_2 \rightarrow CH_3POF_2 + SOF_2$$

The liquid methyl phosphonyl difluoride is an intermediate which may be used for the production of other methyl phosphonyl derivatives. Other alkyl phosphonyl compounds may be produced in a similar manner.

The following example illustrates one method of carrying the invention into effect.

*Example*

A mild steel autoclave of 250 ml. capacity was charged with $[CH_3PCl_3]+[AlCl_4]^-$ complex (16 gm.) and anhydrous hydrogen fluoride (10 gm.), the latter contained in a suspended polythene bucket. The vessel was inverted to mix the reactants and was then allowed to stand at room temperature for several hours until the heat generated by the exothermic reaction was dissipated and the autoclave was quite cold.

The gaseous contents of the autoclave, believed to consist essentially of $CH_3PF_4$, HCl and excess HF, were mixed with a stream of sulphur dioxide, and the mixed gases passed during 2 hours through an iron tube containing stainless steel gauze and kept at 100° C. The off-gases from this tube were condensed in a copper pipe kept at approximately −75° C. and the liquid collected in a polythene receiver protected from atmospheric moisture. The colourless distillate was then heated to 35° C. to remove any excess of hydrofluoric acid. The residual liquid remaining was methyl phosphonyl difluoride $CH_3POF_2$.

The identity of the product was checked by hydrolysing a sample with dilute HCl and evaporating the aqueous solution to dryness in a platinum dish. The product remaining was methylphosphonic acid, M. P. 106° C.

It is to be understood that the invention is not restricted to the examples described and the manufacture of other alkyl phosphorus halides containing both fluorine and chlorine is within the scope of the invention.

What we claim is:

1. Process for the production of an alkyl phosphonic fluoride which comprises reacting an equimolecular complex of a member of the group consisting of ethyl chloride and methyl chloride, phosphorus trichloride, and aluminum trichloride with hydrogen fluoride and then converting the alkyl phosphorus tetrafluoride thus formed into the corresponding alkyl phosphonyl fluoride by the reaction of said tetrafluoride with sulfur dioxide.

2. The process of claim 1 in which the alkyl chloride is methyl chloride.

References Cited in the file of this patent

UNITED STATES PATENTS

| | | |
|---|---|---|
| 2,137,792 | Woodstock | Nov. 22, 1938 |
| 2,146,356 | Schrader et al. | Feb. 7, 1939 |
| 2,254,124 | Stevens et al. | Aug. 26, 1941 |
| 2,311,306 | Ritchey | Feb. 16, 1943 |
| 2,365,466 | Hamilton | Dec. 19, 1944 |
| 2,437,796 | Walling | Mar. 16, 1948 |
| 2,471,472 | Woodstock | May 31, 1949 |
| 2,486,657 | Kosolapoff | Nov. 1, 1949 |
| 2,489,091 | Kharasch | Nov. 22, 1949 |

FOREIGN PATENTS

| | | |
|---|---|---|
| 1,026,806 | France | May 5, 1953 |

OTHER REFERENCES

Michaelis: Berichte, 13, 2174–5 (1880).
Becker: Berichte, 30, 1008 (1897).
Guichord: Berichte, 32, 1574 to 1577 (1899).
Auger: Compt. Rend. 139, 671 (1904).
Kosolapoff: Organo-phosphorus Compounds (Wiley & Sons, 1950), pp. 43–46 and 49.
Kosolapoff text, of record, p. 62.
Clay: J. Organic Chem., vol. 16, pp. 892–894 (1951).